United States Patent [19]

Hsu et al.

[11] Patent Number: 4,457,785

[45] Date of Patent: Jul. 3, 1984

[54] TREATED GLASS FIBERS AND NONWOVEN SHEET-LIKE MAT AND METHOD

[75] Inventors: Edward C. Hsu, Pittsburgh; Chester S. Temple, McKees Racks, both of Pa.

[73] Assignee: PPG Industries, Inc., Pittsburgh, Pa.

[21] Appl. No.: 422,618

[22] Filed: Sep. 24, 1982

[51] Int. Cl.³ .............................................. C04B 35/80
[52] U.S. Cl. ................... 106/308 N; 162/156
[58] Field of Search .................. 106/308 N; 162/156, 162/158

[56] References Cited

U.S. PATENT DOCUMENTS

| | | | |
|---|---|---|---|
| 3,850,869 | 11/1974 | Mohr | 260/29.6 MN |
| 3,869,308 | 3/1975 | Graham | 117/126 GB |
| 3,997,306 | 12/1976 | Hedden | 65/3 C |
| 4,002,445 | 1/1977 | Graham | 65/3 C |
| 4,052,256 | 10/1977 | Renaud et al. | 162/145 |
| 4,052,257 | 10/1977 | Hill et al. | 162/156 |
| 4,110,094 | 8/1978 | Motsinger | 65/3 C |
| 4,118,272 | 10/1978 | Ziegler et al. | 162/156 |
| 4,178,203 | 12/1979 | Chakrabarti | 162/156 |
| 4,178,204 | 12/1979 | Chakrabarti | 162/156 |
| 4,178,206 | 12/1979 | Chakrabarti | 162/156 |
| 4,179,331 | 12/1979 | Chakrabarti | 162/156 |
| 4,183,782 | 1/1980 | Bondoc | 162/156 |
| 4,185,138 | 1/1980 | Graham | 428/391 |
| 4,265,704 | 5/1981 | Nahta | 162/156 |
| 4,274,916 | 6/1981 | Grose | 162/145 |
| 4,284,470 | 8/1981 | Bondoc | 162/123 |

FOREIGN PATENT DOCUMENTS 3475 10/1978 European Pat. Off. .

OTHER PUBLICATIONS

Amasoft ® P-M Concentrate Product Bulletin.

*Primary Examiner*—James Poer
*Attorney, Agent, or Firm*—Kenneth J. Stachel

[57] ABSTRACT

Treated glass fibers are provided that are more dispersible in aqueous media. The glass fibers are treated with a composition having a nonionic surfactant and a cationic quaternary ammonium salt surfactant. The composition may be added simultaneously or sequentially with the chopped glass fibers to the aqueous media in which the glass fibers are to be dispersed. Also, glass fibers can be treated with an aqueous treating composition having the composition and produced into wet or dry chopped glass fibers having a length of about 1/16 of an inch to about 3 inches. The treated glass fibers have good dispersibility in aqueous media with or without the addition of dispersing agents.

14 Claims, 1 Drawing Figure

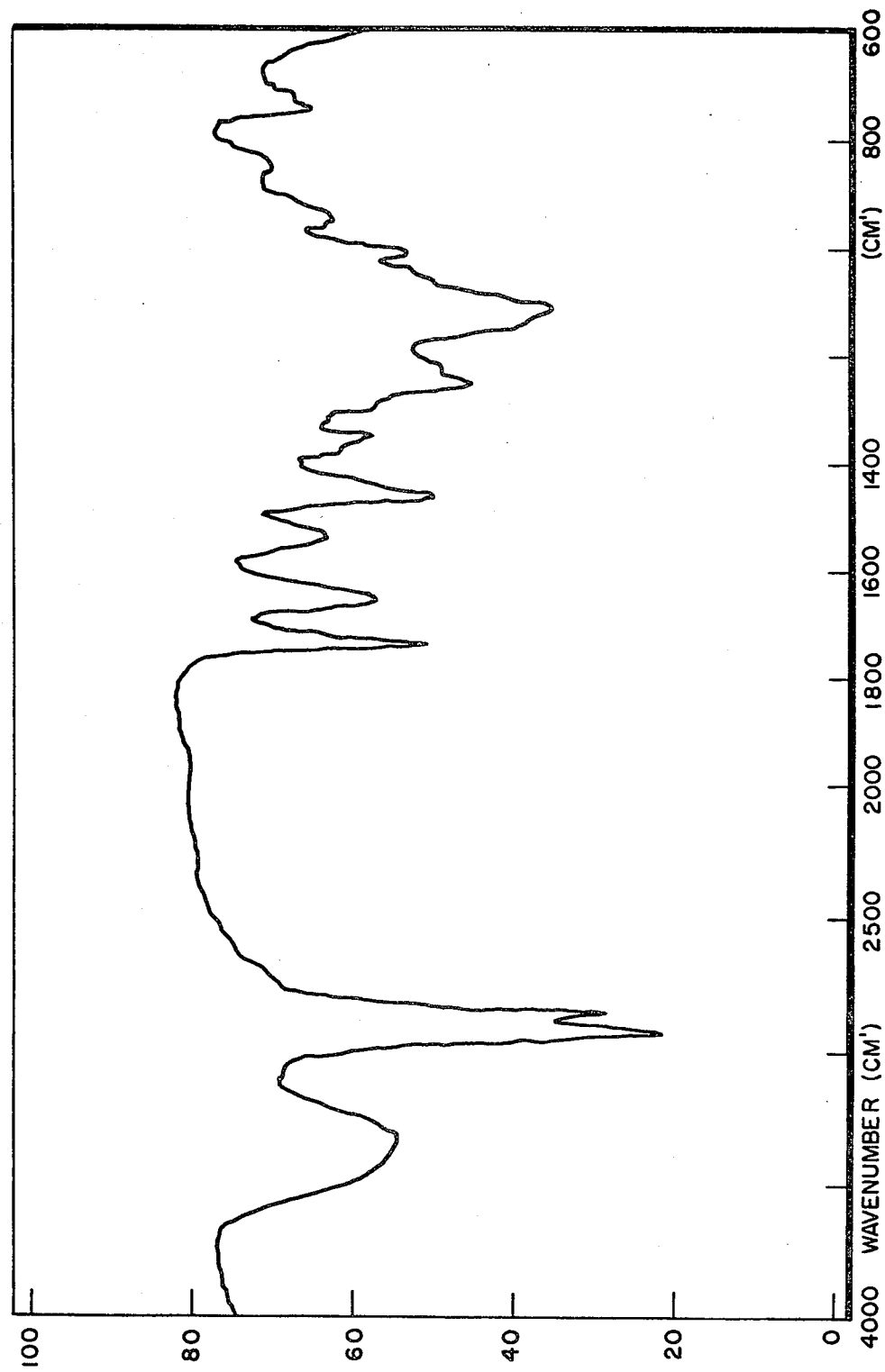

TREATED GLASS FIBERS AND NONWOVEN SHEET-LIKE MAT AND METHOD

The present invention is directed to a composition and a method for the use of same with glass fibers that are used as chopped glass fibers and/or strands to render the chopped glass fibers more readily dispersible in aqueous media, and where the aqueous dispersion of the glass fibers can be used in producing glass fiber-containing paper having good strength properties.

Glass fibers have been used by themselves and in combination with other types of fibers in the production of paper-like sheet materials. Glass fibers have been used as such a supplemental fiber in speciality, synthetic, fiberboard, pulp and composite papers. Also, the glass fibers are finding a use in glass fiber paper, which is a substitute for papers made of asbestos fiber. Also, in recent years, there has been increasing use, and an industry desire for further use, of a nonwoven, sheet-like mat of chopped glass fibers and/or strands as a replacement for organic felts such as cellulose mats in roofing shingles and builtup roofing systems (BUR systems). This usage and further expanded usage of the glass fiber mats in the roofing industry is based on several advantages of using the glass fiber mat. These advantages include: the reduction in the amount of asphalt necessary for the roofing products, the reduction in the weight of the roofing products, increased production rates for producing and roofing products, superior rot resistance, longer product life, and improved fire ratings. These types of papers made with a nonwoven, sheet-like mat are usually produced in a process where chopped fibers, or chopped fiber strands are dispersed in an aqueous media and formed into a mat of chopped glass fibers and/or strands. The nonwoven, sheet-like mat product is produced by contacting the mat of glass fibers with a polymeric binder. An example of such a process is the "wet-laid process".

The wet-laid process involves forming an aqueous slurry of chopped fibers or chopped strands usually with agitation in a mixing tank. The aqueous slurry, usually referred to as slush, is processed into the wet-laid, nonwoven, sheet-like mat by such machines as cylinder or Fourdrinier machines or more technologically advanced machinery, such as the Stevens Former, Roto Former, Inver Former and the VertiFormer machines. The slush is deposited in some manner from a head box onto a moving wire screen or onto the surface of a moving wire-covered cylinder. The slurry on the screen or cylinder is processed into the sheet-like mat by the removal of water, usually by suction and/or vacuum devices, and the application of a polymeric binder with further removal of water and excess binder by suction and/or vacuum devices. The binder impregnated, nonwoven, sheet-like glass fiber mat is dried and cured in one or more ovens.

The strength of the nonwoven, sheet-like mat of glass fibers must be sufficient to withstand the processing steps and speeds, and desirably permit the use of higher speeds to produce the nonwoven, sheet-like mat into various end products. In addition, the strength of the sheet-like mat must be sufficient to permit the sheet-like mat to be stored in any desirable form for possibly extended periods of time without loss of its cohesive properties. Also, the finish on the glass fibers in the sheet-like mat should enable the stored mat to be processed into end use products without cracking or without the generation of large amounts of static during use. The efficient processability of the nonwoven, sheet-like mat into various end products depends on the strength properties of the sheet-like mat and also the structure and homogeneity or uniformity of the arrangement of glass fibers in the mat itself.

Also, the strength of the sheet-like mat is important for the strength that the mat gives to any end product incorporating the mat. For example, when the sheet-like mat of chopped glass fibers and/or strands is to be utilized in producing roofing products, such as shingles and the mat for BUR systems, the sheet-like mat must have sufficient strength properties to enable the processing of the sheet-like mat into these products. The roofing industry is seeking higher strengths for these products and this is especially true for hot wet tensile strengths and flexibility characteristics of the sheet-like mat.

The uniformity of the arrangement of chopped glass fibers and/or strands in the nonwoven, sheet-like mat of chopped glass fibers and/or strands contributes to the strength of the mat and of the ultimate end product. One problem that exists in preparing a uniform mat of chopped glass fibers and/or strands from an aqueous dispersion is that glass fibers are not easily dispersed in aqueous media. This difficulty in dispersing the glass fibers occurs initially upon adding the glass fibers to water. The dispersibility is further complicated by the tendency of the glass fibers, once they present and evenly scattered to some degree in the aqueous medium, to reagglomerate to some degree. The reagglomerated glass fibers are very difficult to redisperse. The lack of a good dispersion of the glass fibers in the aqueous medium hampers the formation of a uniform mat, and adversely affects the strengths of any resultant mat or end product incorporating the mat.

Over the years the art has attempted to deal with the difficulty of dispersing glass fibers in aqueous media by several approaches. One early approach was to maintain an acid pH in the aqueous media to which the glass fibers are added, but such a system required expensive processing equipment due to the acidic nature of the aqueous solution.

The production of glass fibers from molten glass involves attenuating fibers from small orifices in a bushing in a glass melting furnace. The glass fibers are usually attenuated by a mechanical means and are usually gathered into one or more strands and are either collected as continuous strands on a winder or are chopped and collected as wet chopped glass fiber strands. During the attenuation and before the numerous glass fibers are gathered into one or more strands, a treating composition, which is known as a sizing composition, is applied to each of the glass fibers. The aqueous sizing composition is necessary to provide protection to the glass fibers from interfilament abrasion, especially when the fibers are gathered together as strands. Also, the sizing composition can be used to promote compatibility between the glass fibers and any matrix in which the glass fibers are to be used for reinforcement purposes. The collected continuous strands, or chopped strands can be dried, or the wet chopped strands can be packaged in their wet condition. The dried continuous glass fiber strands can be chopped or combined with other glass fiber strands to form rovings, or produced into continuous strand mats or woven. Such steps depend upon the ultimate use for the glass fibers.

A more recent approach in the attempt to disperse glass fibers in aqueous media is the use of a sizing composition having a polysiloxane such as that shown in U.S. Pat. No. 4,052,256. Other sizing compositions have also been used such as those shown in the following U.S. Pat. Nos.: 4,052,257; 4,185,138; 4,284,538 and 4,330,337. These sizing compositions are used to treat glass fibers that are dispersed in water with the aid of dispersing agents. Another approach is to refine the dispersing system that is added to the aqueous media to which the glass fibers are added. This refinement in the dispersing system is independent of whether the glass fibers are sized or unsized.

In several of the approaches of the prior art to achieve a uniform aqueous dispersion of glass fibers, a sizing composition placed on the glass fibers to assist in protecting the glass fibers from interfilament abrasion may actually reduce or inhibit the dispersibility of the glass fibers or the glass fiber strands in aqueous media. It would be advantageous to have treated chopped glass fiber strands, where the sizing composition protects the fibers from interfilament abrasion, and where the sizing assists in dispersing the glass fibers and/or strands in aqueous media without the need for expensive dispersing agents.

It is an object of the present invention to have a composition and a method of using said composition with glass fibers even as an aqueous treating composition for glass fibers to protect the glass fibers from interfilament abrasion, and which renders the chopped glass fibers more readily dispersible in aqueous media and, particularly, to form aqueous dispersions of chopped glass fibers and/or strands useful in forming nonwoven, sheet-like mats having good strength properties.

It is a further object of the present invention to have sized chopped glass fiber strands that are readily dispersible in aqueous media, particularly for use in forming nonwoven, sheet-like mats having good strength properties, such as wet-tensile strength, dry-tensile strength and tear strength and having good processability of the mats themselves, and of the mats into resulting products, such as base materials for roofing products like BUR systems and shingles and flooring.

It is another additional object of the present invention to provide a nonwoven, sheet-like mat of chopped glass fibers and/or strands having one or more polymeric binders, where the mat has good dry and wet tensile strengths and good tear strength properties and that can be used as base layers in roofing materials, shingles, and flooring materials.

SUMMARY OF THE INVENTION

Accordingly, the foregoing objects and other objects gleaned from the following disclosure are accomplished by the present invention.

One aspect of the present invention is a composition for use with glass fibers in any manner and comprising a nonionic surfactant and a quaternary ammonium compound of the onium class of compounds, where the ratio of the nonionic surfactant to be quaternary ammonium compound is in the range of about 1 to about 99 to about 99 to about 1. This composition can be used by the method of adding the composition and chopped glass fibers and/or strands either simultaneously or sequentially with the composition being added before the glass fibers to an aqueous media to form an aqueous dispersion of glass fibers. Also the composition can be used with a carrier such as water to treat glass fibers, where the amount of water is sufficient to give a total solids for the aqueous composition that is effective to permit the treatment of glass fibers as a treating or sizing composition.

The second aspect of the present invention also embodies a method for dispersing glass fibers in an aqueous solution. This method involves an amount of about 10 to about 500 parts per million (PPM) of a blend of about 1 to about 99 weight percent of a nonionic surfactant and about 99 to about 1 weight percent of quaternary ammonium compound being added to the desired amount of water. This addition is with or without the addition of extra dispersing agents and/or defoaming agents. The addition is accomplished with the use of agitation. Chopped glass fiber strands either sized or unsized are added with agitation to the aqueous media having the blend, where the chopped fibers are added to give an amount of around 0.01–1.5% weight percent for one half inch chopped glass fibers and/or strands or any equivalent amount of chopped glass fibers and/or strands of different dimension. The addition of the glass fibers is accomplished with the use of agitation to produce a near uniform aqueous dispersion of chopped glass fibers primarily for use in making a nonwoven, sheet-like mat.

A third aspect of the present invention is glass fibers treated with the composition of the nonionic surfactant and quaternary ammonium compound, and gathered into bundles or strands that have good dispersibility in aqueous media. The glass fibers have an amount of the treating composition in the range of about 0.01 to about 5 and preferably 0.01 to about 3 weight percent on a loss on ignition (LOI) basis of the treated glass fibers in the form of bundles and/or strands. The treated glass fibers can be in any form such as continuous glass fiber strands or chopped glass fiber strands, which are produced as wet chopped or dry chopped glass fiber strands. When the chopped treated glass fibers and/or strands are dispersed in aqueous media, the use of a dispersion system or one or more dispersing agents is not needed, but these agents can be used because the treated glass fibers do not interfere with the function of the dispersing agents.

A fourth aspect of the present invention is an aqueous dispersion of chopped glass fibers and/or strands having present the composition of nonionic surfactant and quaternary ammonium compound, and the nonwoven, sheet-like glass fiber mat produced from such an aqueous dispersion by the removal of an amount of water and the application of one or more polymeric binders. The nonwoven, sheet-like mat has good strength properties such as wet and dry tensile strength and tear strength to be useful as a base or supporting layers in roofing products and flooring products and other products, where good strength mat is required along with a Class A fire rating and good rot resistance.

BRIEF DESCRIPTION OF THE DRAWING

FIG. 1 shows an infrared spectrum (IR) of the composition having a nonionic surfactant and quaternary ammonium salt compound.

DETAILED DESCRIPTION OF THE INVENTION

Hereinafter, in the specification and claims, both fibers and strands will be referred to collectively as fibers. When glass fibers in the presence of the composition of the present invention are dispersed in any type of aqueous media, the aqueous dispersion of glass fibers that is achieved is one having a good, near uniform, dispersion of the glass fibers. This occurs with or without the addition of extra dispersing agents. In making and using a nonwoven, sheet-like mat of the glass fibers, good strength properties are required for the processability of the mat into end use products such as shingles and other roofing products or flooring products. Certain properties for these ultimate products are necessary. These properties include good tear strength and good tensile strengths.

It has been discovered that these properties can be achieved with the use of the composition, treating composition, treated glass fibers, and glass fiber-containing nonwoven, sheet-like mat of the present invention. The achievement of obtaining good properties in all of these areas is effected by the synergistic influence and chemical nature of the chemical components making up the composition having the nonionic surfactant and quaternary ammonium compound, and the interrelationship between the chemical composition and the surface of the glass fibers. It was discovered that the use of the quaternary ammonium compound without the nonionic surfactant in a treating composition for glass fibers did not give the desired results. It was also discovered that the use of the nonionic surfactant alone without the quaternary ammonium compound in a treating composition did not give the desired results. And it was unexpectedly discovered that the use of a composition with both the nonionic surfactant and quaternary ammonium compound either as a treatment on the glass fibers or by addition to the aqueous media with or to which the glass fibers are added led to good dispersibility of the glass fibers and good strength properties of the resulting mat products.

The composition of the present invention has one or more nonionic surfactants. It is believed without limiting the present invention to any degree that the nonionic surfactants function as a buffer for the quaternary ammonium compound that has a very strong hydrophilic character. Useful nonionic surfactants include aqueous soluble and/or dispersible nonionic surfactants such as polyoxyalkylenes such as polyoxyethylene, where the solubility of these materials is due to the repeating ether linkages in a polyoxyalkylene chain $(CH_2CH_2OCH_2CH_2OCH_2CH_2O)_n$. The molecule may be comprised of many of these polymeric chains, and the hydrophilic tendency of these molecules is usually greater with increasing polyoxyalkylene content. Ordinarily complete water miscibility of the polyoxyalkylene surfactant can be obtained when the surfactant has about 60 to 75 percent by weight of the polyoxyalkylene polymer chains. Other nonionic surfactants that can be used include alkoxylated alkyl phenols such as aliphatic, alkoxylated alkyl phenols, linear substituted alkyl phenols and branch-chain substituted alkyl phenols, where nonexclusive examples of the alkyl groups include nonyl, octyl, dialkyl groups, linear alkyl, isooctyl, dodecyl, t-octyl and the like. The alkyl phenols can have an amount of polyoxyalkylene ranging from about 20 to about 95 weight percent of the alkyl phenols. Another type of nonionic surfactant that can be used is the alkoxylated aliphatic alcohols. Nonexclusive examples of which are alkyl poly(ethyleneoxy)ethanols and alkyl phenoxy poly(ethyleneoxy)ethanols and the like, such as alcohols, which are primary and linear, oleyl alcohol, lauryl alcohol, cetyl alcohol, stearyl alcohol, tridecyl alcohol, myristyl alcohol, primary linear alcohols with about 8 to about 18 carbon atoms, tallow, normal alkyl alcohols, secondary alcohols with about 8 to about 18 carbon atoms, trimethyl nonyl alcohol, and the like. Another type of nonionic surfactant that can be used includes carboxylic esters such as glycerol esters, which are partial fatty acid esters of either mono or diglycerides of fatty acids. Nonexclusive examples of the glycerol ester include monococoate, monolaurate, monoricinoleate, monostearate, mono and di fatty acids, monooleate, tallow mono, cotton seed mono, safflower oil mono and polyalkylene glycol esters and polyoxyalkylene fatty acid esters such as polyoxyethylene esters of fatty, rosin, and tall oil acids, where the material has polyethylene glycol and polyoxyethylene along with various acids such as lauric, oleic, stearic, tall oil, fatty, coconut oil, rosin and the like, and where the molecular weight of the polyethylene glycol can vary from about 5 to about 4,000 and the moles of esterified polyoxyethylene can range from about 8 to about 40. Other nonionic surfactants that can be used are fatty acid esters of sorbitan, where monoexclusive examples of the sorbitan ester can be monolaurate, monostearate, monooleate, monopalmitate, and the like. Also, the polyoxyalkylene and/or polyalkylene derivatives of the sorbitan fatty acid esters can be used, where the sorbitan esters can be monolaurate, monostearate, monooleate, monopalmetate and the like and the oxyalkylene and/or alkylene, usually oxyethylene, units per mole of ester can vary from about 3 to about 30. Also, the glycol esters of fatty acids, where the glycol ester could be ethylene glycol or diethylene glycol or propylene glycol can be used. Another type of nonionic surfactant that can be used are the anhydrosorbitol esters and alkoxylated, especially ethoxylated, anhydrous sorbitol esters; and alkoxylated, especially ethoxylated, natural fats, oils and waxes such as castor oil, lanolin alcohols, carboxylic amides such as diethanolamine condensates; and polyoxyalkylene fatty acid amides, which are the mono and di adducts from alkoxylation, especially ethoxylation, of a fatty acid amide, where the fatty acid can be lauric, stearic, oleic, coco, and hydrogenated tallow and the like and the amines can be isopropylamine, ethylamine, and the like. Also included are the polyoxyethylene fatty acid amides. Another type of nonionic surfactant that is useful is the polyalkylene oxide block copolymers such as the block copolymers formed from propylene oxide, butylene oxide, styrene oxide, and cyclohexane oxide and especially the polyoxypropylene-polyoxyethylene block copolymers. Another type of nonionic surfactant is the polysiloxane-polyoxyalkylene copolymers formed by the oxyalkylation of organo silicones to form a copolymer having a molecular weight of about 1500 for the propylene and ethylene oxide portions of the copolymer and about 1500 for the silicone polymeric moiety of the copolymer, and where the total molecular weight of the copolymer is around 6,000. Generally, the hydrophilic-lipophilic balance (HLB) ranges around 1 to about 30.5. The particularly useful nonionic surfactants from the aforelisted compounds are those that have a lower HLB range of less than around 10. Particularly suitable nonionic surfactants are the fatty nonionics that are dispersible in water.

The quaternary ammonium salt compounds useful in the composition of the present invention function as cationic surfactant, and preferably in addition, function as cationic lubricants. Nonexclusive examples of quaternary ammonium compounds useful in the composition of the present invention have the formula for a quaternary ammonium salt of:

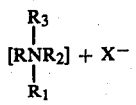

where one or more, but not all of R, $R_1$, $R_2$, $R_3$ can be selected from such compounds as stearyl, tallow, cetyl, lauryl, myristyl, alkyl, alkyls with about 8 to about 18 carbon atoms, tetradecyl, dodecyl, phenyl, alkyl phenyl, isohexadecyl and the like. The other Rs are lower alkyls with about 1 to about 5 carbon atoms, or alkyl phenyls. In the formula, X can be an anionic group such as chloro, fluoro, ido, bromo, hydroxyl, nitrate sulfates or toluene sulfonate or phosphate and the like. A particularly useful quaternary ammonium salt is an alkyl fatty quaternary sulfate. The most suitable quaternary ammonium salts are generally nonheterocyclic, although heterocyclic quaternary ammonium salts such as alkyl pyridinium halides can also be used.

The ratio of amounts of the nonionic surfactant to the quaternary ammonium salt can range from about 1 to 99 to about 99 to 1 with the best results obtained at ratios around 70:30 to around 30:70. When the quaternary ammonium salt has an anion at the X position in the aforementioned formula, which increases the hydrophilic character of the quaternary ammonium salt, the nonionic surfactant can be one which has more hydrophobic character. Depending upon the anion in the quaternary ammonium salt and its effect on the hydrophilic character of the quaternary ammonium salt, the nonionic surfactant used with the quaternary ammonium salt can have more or less hydrophobic characteristics, but generally it has an HLB of less than around 10. The nonionic surfactant and quaternary ammonium salt can be incorporated in the aqueous media and/or aqueous treating composition by sequential or simultaneous addition. The preferred method of adding is by blending the two materials for addition to the aqueous media and/or aqueous treating composition. A particularly useful blend of the nonionic surfactant and quaternary ammonium salt has the IR spectrum of FIG. 1 and has a specific gravity of 0.996, an activity of 95 percent, a flash point of 125° F. (52° C.), 1600 centipoise (cps) with a #3 spindle and 30 rpm at 70° F. (21° C.) and is an opaque, amber liquid. Such a composition is that available as Amasoft PM Concentrate from American Color and Chemical Corporation, and this material is described as essentially 100 percent active blend of a fatty methosulfate quaternary compound and fatty nonionic surfactant.

The composition of the nonionic surfactant and quaternary ammonium compound may be used as an additive to the aqueous solution either by addition before or simultaneously with the addition of the glass fibers to the aqueous media in order to form a dispersion. In this instance the amount of the composition used is in the range of about 10 to about 500 parts per million (PPM) of the aqueous media, although greater amounts may be used but diminishing returns are obtained as far as any further improvement in the dispersion.

In addition to the composition in the aqueous media, a viscosity building agent may be used. Nonexclusive examples of viscosity building agents include hydroxy and/or carboxy methyl cellulose and soluble salts thereof, carboxy methyl hydroxy ethyl cellulose and soluble salts thereof and hydroxy ethyl cellulose and mixtures thereof. Particularly useful viscosity building agents are available from Hercules, Inc. under the trade designation Natrasol 250 LR and HR substituted and unsubstituted hydroxy ethyl cellulose and available from Dow Chemical Co. under the trade designation of Separan polyamides. Also any conventional dispersing and defoaming agents may be present in the aqueous media. Although the composition of the present invention can be used alone without any addition dispersion aids, any of the conventional dispersion aids can also be used in the aqueous media. Nonexclusive examples of such dispersing aids that can be used include the polyoxyethylated tallow amine dispersing agent available from GAF Corporation under the trade designation "Katapol" agents. Another example of a dispersing agent that can be used with the chopped glass fiber strands of the present invention is the dispersing agent available from Diamond-Shamrock Chemical Company under the trade designation "Nopcosperse" and especially the "Nopcosperse" FFD product. The Nopcosperse FFD product is a blend of alkyl sulfate quaternary of the alkyl amino fatty acid amide or amine in a water dispersible, mineral oil with an inorganic silica defoaming agent. Other examples of dispersing agents that can be used include the quaternary ammonium compounds such as those available under the trade designation "Arquad 2 HT-75" and the like. Also, quaternary ammonium surfactants can be used such as those available under the Arquad and Aliquat trade designations as can mixtures of amine oxides with derivatized quar gum and mixtures of quar gum and isostearic amides.

In the process of the present invention, the desired part per million amount of the composition of the nonionic surfactant and quaternary ammonium compound is added separately or together to the aqueous media with agitation and with the addition of the desired amount, between about 0.001 to about 3 and preferably about 0.01 to about 1.5 weight percent of the aqueous media of around ½ inch (12.7 mm) chopped glass fibers, either sized or unsized. Generally the length of the chopped glass fibers vary from about 1/16 of an inch to about 3 inches (0.1 mm to 76.2 mm) or more particularly the average length varies from about ⅛ of an inch (0.125 mm) to about 2 inches (50.8 mm). When the average length of the glass fibers is less than ½ of an inch (12.7 mm), the amount of glass fibers added to the aqueous solution is preferably in the upper portion of the range and higher. When the average length of glass fibers is more than ½ of an inch (12.7 mm), the amount used is preferably in the lower portion of the range especially as the average length approaches 3 inches (76.2 mm). Whenever the chopped glass fibers are added to the aqueous media, it is with the use of agitation. After the chopped glass fibers have been added to the aqueous media along with or after the addition of the composition, the aqueous solution is agitated for a period of time to produce the dispersion that contains glass fibers and that is used preferably in the making of the nonwoven, sheet-like mat.

The use of the nonionic surfactant and quaternary ammonium compounds in treating glass fibers provides a basic degree of protection to the fiber from interfilament abrasion, when the fibers are gathered into strands and chopped in a wet chop process. If additional processing steps are to be used for the glass fibers, it would be worthwhile to include additional additives like film forming polymers and/or lubricants into the treating composition.

When the composition of the nonionic surfactant and quaternary ammonium compound is used to treat glass fibers as a sizing composition, such a sizing has present a major amount of a liquid carrier. The liquid carrier is preferably water in order to make the treating composition an aqueous treating composition. The amount of water present in the aqueous treating composition is that amount necessary to give the treating composition a total solids content within a level, whereby the viscosity of the aqueous treating composition is acceptable for application to glass filaments, that is around 0.6 to 50 centipoise at 140° F. (60° C.). Particularly, the amount of water present in the aqueous treating composition is sufficient to give a total solids (nonaqueous) content of the aqueous treating composition in the range of about 0.1 to about 25 percent by weight and preferably about 1 to about 10 percent by weight of the aqueous treating composition. The ratio of the amounts of the nonionic surfactant to quaternary ammonium salt is the same as when the composition is added to the aqueous media. This ratio is about 1 to about 99 to about 99 to about 1 and preferably about 70:30 to about 30:70. Generally, the amount of the nonionic surfactant present in the treating composition ranges from about 0.01 to about 5 weight percent of the aqueous treating composition. Generally, the amount of the quaternary ammonium salt added to the treating composition is in the range of about 0.01 to about 5 weight percent of the treating composition.

In addition, when the treating composition of the present invention is used as a sizing composition there may be present any of the chemical compounds, which are known to be useful in aqueous treating compositions for treating glass fibers. For example, film forming polymers, lubricants and the like can be added. Another additional chemical compound that can be used is one or more water soluble or dispersible nonpolymeric amide compounds such as urea or monoamides, diamides, amine-containing amides, carbamide and derivatives, where the amide and amine groups are primary or secondary or mixtures thereof. Typically, when the amide compound is present, it is used in an amount in the aqueous sizing composition of about 0.1 to about 2 weight percent of the aqueous treating composition when the amide has an activity equivalent to urea. Although the aforementioned additives and the following polyol additives may be used, their use is not necessary for the composition of the present invention to function properly.

Another chemical compound that may be used in the treating composition is one or more moderately water soluble or water dispersible or water emulsifiable polyols. Polyols suitable for use are the di or polyfunctional hydroxy compounds or polymeric compounds. Such polymeric compounds would include a polyvinyl alcohol. Useful polyols are those that are stable at temperatures up to about 120° C. Nonexclusive examples of these compounds include alkylene glycols having up to 6 carbon atoms such as ethylene glycol, propylene glycol, 1,2-butane diol, 1,3-butane diol; 1,4-butane diol or tetramethylene glycol, 2,3-butane diol, 1,4-hexane diol, pentamethylene glycol, hexamethylene glycol and the like; neopentyl glycol, hexylene glycol, pentaerythritol, dispentaerythritol, trimethyol propane, sorbitol, glycerine, and polyalkylene glycols having the formulae:

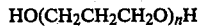

where n is a positive integer of at least 2 and usually commercially is from 2 to about 25. Representative examples of this last class include di(ethylene) glycol, dipropylene glycol, tri(ethyleneoxy) glycol, dodecyl-(ethyleneoxy) glycol; eicosyl (ethyleneoxy) glycol, tri(-propyleneoxy) glycol, dodecyl (propyleneoxy)glycol and the like. Also, ether polyols such as diethylene glycol, and triethylene glycols, dipropylene glycol and the like can be used. Also, glycol esters of fatty acids like laurate, palmitate, stearate, oleate, dilauarate, dimyristate and the like can be used. In addition, the higher boiling esters of glycols like acetates of methyl, ethyl and butyl monoethers can be used. Also, alkyl ethers of alkylene glycols, mono and diester of ethylene or propylene glycols and alkylene-glycols, polyalkylene glycols having a formula like formula (I) or (II), but where n is greater than about 25, ether esters and polyoxyalkylene glycols can be used.

A particularly useful class of polyols for the present invention, are those polyols having the polymeric polyols such as polyalkylene polyol and polyoxyalkylene polyols and mixtures thereof. The polyoxyalkylene polyols are from a class of compounds known as polyether polyols. The water dispersible, high molecular weight polyoxyalkylene polyols can be made by any suitable method known to those skilled in the art such as the base catalyzed reaction of alkylene oxide, such as methylene oxide, ethylene oxide, propylene oxide, butylene oxide, and the like with triols such as glycerol, trimethylolpropane and 1,2,6-hexantriol. Polyols having four or more hydroxyl groups have similarly been reacted with the alkylene oxide to prepare the oxyalkyl ated derivatives. The higher alkylene materials and higher polyol materials such as pentaerythritol and sugar alcohols can be used if any resulting solid material is properly emulsifiable with surfactants in water. This relates to the water dispersible nature of the polyoxyalkylene polyol. So the polyoxyalkylene polyol can be either a solid or liquid as long as it is dispensible or emulsifiable or soluble in water. Nonexclusive examples of these polyether polyols include poly(oxypropylene) adducts of trimethylolpropane, poly (oxypropylene) adducts of glycerol; poly (oxypropylene-B-oxyethylene) adducts of trimethylol propane and the like. The average molecular weight range of these polyether polyols is generally about 300 to about 12,000 and preferably about 700 or more to around 10,000. Mixtures of these polyether polyols can be used such as a blend of a 7000 average molecular weight, liquid polyalkylene polyol with a 10,000 average molecular weight, liquid polyoxyalkylene polyol. This blend can have any proportion of the two materials like a 50/50 blend. Commercial examples of these materials include the liquid polyoxyalkylene polyol designated Pluracol®V-7 polyol and the liquid polyalkylene polyol designated Pluracol®V-10 polyol both available from BASF-Wyandotte Corporation, Industrial Chemicals Group, Wyandotte, Mich.

The Pluracol®V-7 polyol has the following properties:

| PLURACOL ® V-7 POLYOL TYPICAL PHYSICAL PROPERTIES | |
|---|---|
| Specific Gravity, 25° C./25° C. | 1.090 |
| Flash Point, °F. | 510 |
| Fire Point, °F. | 580 |
| Pour Point, °F. | +25 |
| Ash, Typical, %. | 0.2 |
| Specification (max.), % | 0.3 |
| Viscosity, as is, at 210° F., SUS | 930 |
| cs | 200 |
| at 100° F., SUS | 5600 |
| cs | 1200 |
| Viscosity of Aqueous Solutions at 100° F. | |
| 20% Solution, SUS | 49 |
| cs | 7.0 |
| 50% Solution, SUS | 380 |
| cs | 81.4 |
| Inverse Cloud Point (2.5% aqueous solution) °F. | 180 |
| Solubility | Pluracol ® V-7 is soluble in water, alcohols, and glycols |

The Pluracol® V-10 polyol has the following properties:

| PLURACOL ® V-10 POLYOL TYPICAL PHYSICAL PROPERTIES | |
|---|---|
| Appearance | Pale, yellow, clear viscous fluid |
| Viscosity at 210° F. | 6,000 cst (AST D445-53T) |
| at 100° F. | 45,000 cst (AST D445-53T) |
| Specific Gravity 60/60° F. | 1.089 (BWC test) |
| Flash point | 510° F. (ASTM D2-52) |
| Fire point | 535° F. (ASTM D92-52) |
| Surface tension (1% aq.) | 54.7 dynes/cm. at 75° F. (ASTM D1331-56) |
| | 48.4 dynes/cm. at 105° F. (ASTM D1331-56) |
| | 44.2 dynes/cm. at 110°F. (ASTM D1331-56) |
| Shear Stability (in a typical fire resistant fluid) change in viscosity 12,000 cycles, 1000 psi | +1% (nod. VVL 1 method 3471) |

An even better suited class of polyol for use in the treating composition of the present invention to maximize the benefits achieved are the polyols that are liquids having a viscosity greater than about 30,000 centistokes at about 100° F. (38° C.) and about 1,000 centistokes at 210° F. (99° C.) and in particular, the less water soluble polymeric polyol like those aforementioned polyoxyalkylene polyols.

The amount of the polyol present, if used, in the aqueous treating composition is in the range of about 0.3 to about 10 weight percent of the aqueous treating composition. The most useful amount, when used, in the aqueous treating composition of the present invention is a predominant amount of the solids of the composition. This is on the order of about 50 to about 95 weight percent or more of the solids (non-aqueous components) of the treating composition.

The treating composition of the present invention can be prepared by any method and with any equipment known to those skilled in the art for preparing aqueous treating compositions to be applied to glass fibers. For instance, the chemical compounds can be added sequentially or simultaneously to water or in any order whatsoever. If any of the chemical compounds are only slightly water soluble, it is better to dissolve these materials in warm water before diluting with cold water to prepare the aqueous treating composition in its final volume. This is especially true for the higher viscosity polyoxyalkylene polyols.

The aqueous treating composition can be applied to any type of glass fiber by any method known to those skilled in the art. For instance, the glass fibers can be prepared by any method known to those skilled in the art such as by mechanical attenuation or the like from batch compositions known as "E" glass or "621" glass or more environmentally acceptable derivatives thereof, and other types of glass such as "A" glass, "C" glass and "S" glass. The aqueous treating composition can be applied to the glass fibers after they are formed and during their attenuation by any type of applicator such as belt applicators, roll applicators or any applicator, which enables the liquid to contact the glass fibers. The amount of the aqueous treating composition applied to the glass fibers should be sufficient to give a coating of the aqueous treating composition on treated glass fiber strand of around 0.01 to about 5 weight percent of the treated glass fiber strand. The treated glass fibers can be chopped directly as fibers or gathered into one or more glass fiber strands and chopped, where the fibers or strands are chopped during the process of forming the glass fibers after the treating composition has been applied to them into lengths varying from about 1/16 of an inch to about 3 inches and more particularly about ½ inch to about 1 inch. Such a process is commonly referred to in the art as the wet chop process. Also the glass fibers can be treated and gathered into strands much like the wet chop process, but then collected as continuous glass fiber strands in a forming package and subsequently chopped in a remote wet chop process or after drying the strands can be chopped in a dry chop process into lengths similar to those of the direct wet chop process. In preparing the glass fiber strand, the filament diameter of the glass fibers can vary from around 3 microns to around 20 microns or higher and preferably around 9 to 18 microns.

The aqueous dispersion of treated glass fibers is achieved merely by placing the wet or dry chopped glass fibers of the desired length into a bath of water with agitation and with or without dispersing aids to form an aqueous dispersion of glass fibers for use in the wet-laid process or with other paper making processes and machines. The amount of the chopped treated glass fibers in the aqueous dispersion can range from about 0.001 to about 5 but preferably about 0.01 to about 3 weight percent of the aqueous dispersion. Although the treated glass fiber strands of the present invention can be used without dispersion aids, any of the conventional dispersion aids can be used along with the chopped, treated glass fibers of the present invention. Nonexclusive examples of such dispersing aids are those previously mentioned for use with the nonionic surfactant and quaternary ammonium salt compound when they are used as a dispersing aid and includes the use of the nonionic surfactant and quaternary ammonium salt compound as a dispersing aid. Also, as previously discussed, secondary viscosity builders or thickeners can be used.

The nonwoven, sheet-like mat of treated chopped glass fibers and/or chopped glass fibers dispersed in aqueous media with the use of the nonionic surfactant and quaternary ammonium salt composition can be made by any method and with any apparatus known to those skilled in the art. For example, a hand mold method and apparatus can be used or the Fourdrinier paper machine or cylinder machines can also be used. Also, the machines known as the Stevens former of the Beloit Corporation and the Rotoformer from the Sandy Hill Corporation and the Inver former from the Beloit Corporation and the Vertiformer from the Black Clawson Company can all be used to form the mat of the present invention. In the process, the aqueous dispersion of glass fibers may be diluted with white water and held in a head box of any of the aforementioned machines. The white water is water containing similar dispersing agents as in the aqueous dispersion of glass fibers, where the white water is fresh and/or recirculated from collection points in the process of forming the nonwoven mat. The aqueous dispersion from the head box is placed on a screen or cylinder, where some water is removed usually by vacuum or suction means. The mat has a polymeric binder applied to it and any excess binder is removed by vacuum and/or suction means. The binder-containing mat is dried and cured in one or more ovens to produce the nonwoven, sheet-like mat. The mat is collected usually in a large roll weighing from several hundred pounds to close to 1,000 pounds.

The nonwoven, sheet-like, glass fiber mat of the present invention is suitable for use as a replacement for felt in shingles and also for use in builtup roofing (BUR) systems and for use as backing materials and base materials in flooring applications. In these applications, the mat with the polymeric binder must have certain strength properties. These strength properties are measured by dry tensile, wet tensile, hot-wet tensile and tear strength of the mat with the polymeric binder.

The polymeric binders that are used are any of the group of the so-called "wet-strength" resins, which include such resins as urea formaldehyde and cationic polyamide-epichlorohydrin commercially available from Hercules Incorporated under the trade name "Kymene 557 H" and cationic urea-formaldehyde resins available from Hercules, Inc. under the trade designations "Kymene 882" and "Kymene 917." Also, melamine-formaldehyde type and phenol formaldenyde type and resorcinol formaldehyde type and polymerizable polyfunctional N-methylol compounds, notably N-ethylol ureas such as dimethylol urea and N-methylol melamine type resins and other amino resins known to those skilled in the art can be used. Other types of resins that can be used are polyvinyl alcohol, polyvinyl acetate, and acrylic polymers and copolymers. Also, mixtures of resins can be used such as the urea formaldehyde or melamine formaldehyde resins mixed with styrene butadiene copolymer latices and other latices and/or acrylic polymers or copolymers like acrylamide. The amount of binder used in the nonwoven, sheet-like mat product is in the range of about 3 to about 45 percent, preferably about 10 to about 30 percent based on the weight of the unfinished mat. If the amount of binder is too great, the porosity of the mat could be adversely affected, and, if the amount is too low, the integrity of the mat could be adversely affected. After the binder is applied, the binder-containing glass fiber mat is dried to set or cure the binder. This can be accomplished with can driers or any one or more drying devices used in the art.

PREFERRED EMBODIMENT OF THE INVENTION

Glass fibers that are treated with the aqueous treating composition of the present invention are preferably those having filament diameters of around 3 to about 20 microns and preferably, about 10 to about 19 microns and most preferably around 16 microns. The aqueous treating composition preferably is a blend of the nonionic surfactant and quaternary ammonium salt compound having the IR spectrum of FIG. 1 and available from American Color and Chemical Corporation under the trade designation of Amasoft PM Concentrate. The preferred amount of the blend of the nonionic surfactant and quaternary ammonium salt present is in the range of about 0.1 to about 5 weight percent of the aqueous treating composition, where the ratio of the nonionic surfactant to the quaternary ammonium salt in the blends is around 3:1 to around 1:3. The amount of water present in the aqueous treating composition is preferably the remainder of the treating composition. The aqueous treating formulation is prepared by adding the liquid blend of nonionic surfactant and cationic quaternary ammonium salt, which is available commercially, to water in a vessel. The amount of water is at least sufficient to disperse the blend. Additional water is added to dilute the mixture to the final desired volume. If foam buildup occurs, any defoaming agent can be added, but preferably the defoaming agent available from Diamond-Shamrock Company under the trade designation Nopco NDW is added.

The aqueous treating composition is used to treat the glass fibers preferably in a wet chop process, where the treated glass fibers are gathered into strands and chopped during the fiber formation and attenuation process. Preferably, the treated glass fibers are chopped into lengths ranging from about ½ inch (12.7 mm) to a little over 1 inch (25.4 mm). The treated glass fiber strands have an amount of the treating composition ranging from about 0.01 to about 5 and most preferably about 0.5 to about 1 percent of the treated glass fiber strands.

The treated chopped glass fiber strands are added to water to form a dispersion, and it is preferred that a dispersing agent such as Katapol dispersant in combination with the Natrasol 250 HR thickener be used in amounts in the range of about 0.001 to about 0.05 weight percent of the aqueous dispersion. Greater amounts can be added, but the additional benefit is more than offset by the cost of the materials. The chopped glass fibers added to the aqueous solution are preferably added to the aqueous solution containing the dispersing agents in an amount of about 0.001 to about 5. weight percent and most preferably diluted to 0.01 to about 1 weight percent of the aqueous dispersion. The dilution is accomplished with white water. The diluted aqueous dispersion of chopped, treated glass fibers are placed on a screen or cylinder and around 50 percent of the water is removed by vacuum means. To this mat, the polymeric material is applied, which is preferably a modified urea formaldehyde that has anionic functionality to form the nonwoven, sheet-like mat. The anionic modified urea formaldehyde may be modified by a blend of polymers or by the presence of anionic groups placed on the urea formaldehyde resin. The mat is dried and cured in an oven after any excess binder is removed by vacuum or suction means to produce the nonwoven, sheet-like mat of the present invention for use in shingles, BUR systems and floor coverings.

Additional information and further illustrations of the embodiment of the aqueous treating composition, treated glass fibers, dispersion and nonwoven, sheet-like mat of the present invention are presented in the following examples, although these examples do not limit the scope of the invention to these specific embodiments.

EXAMPLES

Several examples of the treating compositions of the present invention are given in Table I. Table I presents data of the formulations of these examples. These formulations were prepared in a manner identical to that disclosed in the specification and the preferred embodiment section of the specification with the various chemical compounds shown in Examples 1-4 and Examples A, B and C.

TABLE I

| | Examples of Treating Compositions | | | | | | |
|---|---|---|---|---|---|---|---|
| | Example 1 gms/wt %/wt %/Aq.[1]/solids[2] | Example 2 gms/wt %/wt %/Aq./solids | Example 3 gms/wt %/wt %/Aq./solids | Example 4 gms/wt %/wt %/Aq./solids | Example A gms/wt %/wt %/Aq./solids | Example B gms/wt %/wt %/Aq./solids | Example C gms/wt %/wt %/Aq./solids |
| Blend of fatty nonionic surfactant and fatty metho-sulfate quaternary compound (Amasoft PM concentrate surfactant blend) | 180/2.4/100 | 30/0.4/100 | 20/0.3/100 | 10/.13/15.6 | 300/.78/75 | 300/0.78/60 | 300/.79/100 |
| Polyoxyalkylene adduct of trimethylolpropane (V-10) | — | — | — | — | 100/.26/25 | — | — |
| Diethylene glycol | — | — | — | — | — | 100/.26/20 | — |
| Gelvatol (polyvinyl alcohol resin) (96% solids) | | | | 50/.65/78 | | | |
| Vinyl tris (2-methoxyethoxy silane (Al72) | — | — | — | 4/.05/6.25 | — | — | — |
| Urea | — | — | — | — | — | 100/0.26/20 | — |
| Water (liters) | 7.571 | 7.571 | 7.571 | 7.571 | 37.85 liters | 37.85 liters | 37.85 liters |
| Moisture Content | 11.3 | 10.9 | 5.9 | 12.6 | — | — | — |
| Percent LOI | 0.21 | .07 | 0.06 | 0.07 | — | — | — |

[1]Weight percent of aqueous treating composition
[2]Weight percent of solids in aqueous treating composition

TABLE II

| | Dispersion and Properties of Nonwoven Sheet-like Mat | | | | | | | | | |
|---|---|---|---|---|---|---|---|---|---|---|
| | Example 1 | Example 2 | Example 3 | Example 4 | Example 5 | Example 6 | Example 7 | Example 8 | Commercial Example I | Commercial Example II |
| Dispersion System: | | | | | | | | | | |
| Katapol cationic surfactant | 200 ml | 200 ml | 200 ml | 200 ml | — | — | — | — | 200 ml | 200 ml |
| Natrasol 250 HR thickener | 363 gm | 363 gm | 363 gm | 363 gm | — | — | 363 gm | 363 gm | 363 gm | 363 gm |
| Amasoft PM Comcentrate (Blend of fatty nonionic surfactant and fatty metho-sulfate quaternary salt compound) | — | — | — | — | | | 200 ml | 200 ml | — | — |
| Water Gal./liters | 400/1514 | 400/1514 | 400/1514 | 400/1514 | 400/1514 | 400/1514 | 400/1514 | 400/1514 | 400/1514 | 400/1514 |
| Dispersion Rating | Good | Excellent | Excellent | Excellent | Good | Fair+ | Excellent | Excellent | Excellent | Good |
| Physical Properties | | | | | | | | | | |
| Fiber Length of Glass Fibers | ¼" | ½" | ½" | ½" | ½" | ½" | ½" | ½" | ½" | ½" |
| Mat Weight gm/m² | 99 | 90.7 | 96.9 | 93.2 | 96.7 | 99.8 | 99.8 | 98.6 | 92.4 | 100.6 |
| Percent Resin (% LOI) | 15.1 | 14.3 | 16.3 | 21.3 | 12.5 | 13.0 | 21.3 | 20.7 | 18.7 | 17.8 |
| Weight of Resin Mat | .487 | .45 | .47 | .425 | .49 | .503 | .455 | .453 | .435 | .477 |
| Tensile Strength lb/in² | 18.3 | 20.8 | 20.3 | 26.1 | 5.6 | 18.8 | 26.6 | 24.5 | 23.0 | 30.4 |
| 1 Dry Tensile/Wet Tensile/Hot Wet Tensile | — | — | — | — | — | — | — | — | — | — |
| 2 Hot/Wet Tensile Retention | — | — | — | — | — | — | — | — | — | — |
| Tear Strength (gm) | 232 | 192 | 154 | 173 | 152 | 179 | 202 | 155 | 179 | 210 |

| | Example A | Example B | Example C | Commerical Example I-A | Commerical Example II-A |
|---|---|---|---|---|---|
| Dispersion System: | | | | | |
| Katapol cationic surfactant | 0.5 grams | 0.5 grams | 0.5 grams | 0.5 grams | 0.5 grams |
| Natrasol 250 HR thickener | 7.5 grams | 7.5 grams | 7.5 grams | 7.5 grams | 7.5 grams |
| Amasoft PM Concentrate (Blend of fatty nonionic surfactant and fatty metho-sulfate quaternary salt compound) | — | — | — | | |
| Water Gal./liters | 15 liters | 15 liters | 15 liters | 15 liters | 15 liters |
| Dispersion Rating | — | — | — | — | — |

TABLE II-continued

Dispersion and Properties of Nonwoven Sheet-like Mat

| Physical Properties | | | | | |
|---|---|---|---|---|---|
| Fiber Length of Glass Fibers | ½" | ½" | ½" | ½" | ½" |
| Mat Weight gm/m² | 119.8 | 127.3 | 124.3 | 124 | 124.8 |
| Percent Resin (% LOI) | 20.86 | 19.45 | 19.17 | 19.12 | 19.24 |
| Tensile Strength lb/in² | — | — | — | — | — |
| 1 Dry Tensile/Wet Tensile/Hot Wet Tensile | 43.3/26/14.1 | 47/31/17 | 39.9/23.5/13.2 | 2/29.5/22.1 | 44.6/28./18.9 |
| 2 Hot/Wet Tensile Retention | 33 | 36 | 33 | 50 | 42 |
| Tear Strength (gm) | 932 | 1061 | 92.8 | 848 | 771 |

The treating compositions of Table I were used to treat glass fibers having a filament diameter of around 15.88±0.63 microns in a wet chop forming process. The individual glass fibers were gathered into strands of around 2000 filaments per strand and chopped into lengths, where the average length of the chopped glass fiber strand was around 0.5 inch (12.7 mm). In obtaining these seven separately treated chopped glass fiber strand samples from the seven examples of the treating formulation of Table I, all of the glass fibers were treated in a similar manner with a belt-type applicator, where the glass fibers were attenuated at a similar speed and the belt type applicator was driven at a similar speed. The amount of the treating composition present on the treated glass fibers in an amount of around 0.05 to about 0.5 percent loss on ignition (LOI).

These various samples of treated chopped glass fiber strands were used to make seven separate aqueous dispersions of glass fibers, which were then prepared into seven separate nonwoven, sheet-like glass mats, impregnated with binder. These seven binder containing mat samples were then tested for various physical properties. The properties tested included tensile strength and tear strength. The results of the testings are given in Examples 1 through 4 and A, B and C in Table II. Also Table II at Examples 5 and 6 shows data for glass fibers sized with the size of Examples 1 and 2, respectively, where the chopped sized glass fibers were added to water without the use of any dispersing agents. Also Table II at Examples 7 and 8 shows data for the use of glass fibers having the size of Examples 1 and 4, respectively, of Table I, where the chopped sized glass fibers were added to water, having only the nonionic surfactant and cationic quaternary ammonium salt surfactant. Finally, Table II presents comparative data for the use of chopped glass fibers that are commercially available, which were added to water to produce a mat product.

For the examples designated 1 through 8 and commercial examples I and II for Table II, involving the formulations of Examples 1-4 of Table I, the nonwoven, sheet-like mat was produced according to the following procedure. The treated ½ inch glass fibers with around 12 percent moisture in an amount of around 16 lb. (7.3 kg) were added with stirring to a hydropulper that contained an aqueous medium. The aqueous medium was comprised of 400 gallons (1514 liters) of water adjusted to a pH of around 8-8.5 with ammonium hydroxide.

The particular dispersing and/or thickening agents, if any, mentioned in Table II for Examples 1 through 8 and commercial examples I and II in their respective amounts had been added to the water. The water medium in the hydropulper had been stirred for around 5 minutes before the addition of the chopped glass fibers. The dispersion produced had a 0.5% consistency for 5 minutes. The dispersion was diluted with white water to approximately a 0.02 percent consistency. This diluted dispersion was placed on a 0.17 mesh wire screen on a Former Delta-25 machine available from Sandy-Hill Corporation, Hudson Falls, New York. About fifty (50) percent of the water was removed from the glass fibers on the wire by suction means. After the water removal, the binder was applied. The binder was a blend of an acrylic latex with the urea formaldehyde binder. The acrylic latex was a Rhoplex material from Rohm and Haas and the urea formaldehyde was that available from Pacific Resins. The binder was applied either by spraying or by a liquid curtain application. The excess binder was removed by suction means. The nonwoven, sheet-like mat was dried and cured in an oven at 400° F. (204° C.), and was post cured at 400° F. (204° C.) for around 5 minutes in a forced air oven. The nonwoven, sheet-like mats that were produced were tested for physical properties.

The nonwoven, sheet-like mats of glass fibers tested in Examples A, B and C and commercial examples IA and IIA in Table II were prepared by a hand sheet making procedure. The procedure involved using a sheet mold with a 55 gallon drum used for recirculating white water. An anionic urea formaldehyde resin commercially available from Pacific Resins under the trade designation 3958-P was placed into a solution in a premix vessel. The sheet mold was flushed and cleaned as were the connecting lines and the 55 gallon (208 liter) drum recirculating tank. The white water was prepared by filling the 55 gallon drum with 27.5 gallons (104 liters) of city or a specified water. To this in the pertinent examples of Table II there was added 51 grams of thickener, which was Natrasol 250 HR and the aqueous mixture was stirred for around 2 minutes. A pH modifier was added to adjust the pH to around 8 to 8.5 with stirring. The dispersing agent, mentioned in Table II, if one was used, was added and the mixture stirred for around 2 minutes. In a premix bucket, the slurried glass fiber solution was prepared by adding around 15 liters of city water and stirring was performed by a Lightning mixer with an air pressure set about 10 psi. The dispersing agents recited in Table II were added in a sequence similar to the preparation of the white water and the mixture was stirred for 10 minutes. An amount of 75 grams of glass fiber based on 0% moisture were added to make a 0.5 weight percent batch of slurried fibers, and the mixture was stirred for 5 minutes at 20 psi. The three nonwoven, sheet-like mats were prepared by filling the sheet mold from the screen up with around 35 liters of white water using a sump pump, which is submerged in the 55 gallon drum recirculating tank. Any air bubbles that formed on the screen were removed with a plunger. Around 1450 ml. to 1500 ml. of the 0.5 percent slurried fiber glass batch solution was added to the water in the sheet mold. On final dilution, this gives a percentage of 0.02 percent. The water is agitated with a plunger in the sheet mold. After five seconds, the white water is drained back into the 55 gallon drum and the sheet mold is opened, and the screen and glass mat are carefully removed together. The glass mat is dewatered carefully by slowly and evenly pulling the mat and screen away from the mold and over a slot having dimensions of 3/16 of an inch (4.76 mm) by 12 inches (304.8 mm), or some similar length. The anionic urea formaldehyde resin is applied to the glass mat with a paint sprayer by evenly spraying and saturating the mat without causing any distortion in the mat format. The excess resin is removed from the mat by pulling the mat and screen evenly and smoothly away from the slot across a vacuum bar. The mat and screen are flipped over a piece of available fabric and the screen is removed and the fabric and mat are placed in an oven for approximately five minutes to dry. After drying is completed, the sheet is ready for curing and testing. This curing is accomplished by post cure a in forced air oven at 400° F. (204° C.) for 5 minutes.

For Examples 1-8 and the commercial examples I and II, the tensile strength of the nonwoven, sheet-like mat was measured under various conditions using a sample of the material, which was 1 inch (25.4 mm) by 6 inches (152.4 mm). The dry tensile of the sample was tested in a Pendulum Table Tester machine with a jaw distance of 4 inches (102 mm), where the jaws were padded or there were taped sample ends. In the dry tensile test, the sample was placed in the Instron and the breaking point was measured in pounds per inch. The tear strength of the sample was measured according to a standard test of the American Society of Testing Materials (ASTM) test procedure D689 with a revision using the Elmendorf tear tester. The revision allows the use of data on reinforced glass mats, where the tear may deviate from the initial slit in the sample instead of following a reinforcing strand.

The tensile strengths of the nonwoven, sheet-like mat for Examples A, B, C and commercial examples IA and IIA were measured under various conditions using a sample of the material, which was 1 inches by 7 inches. The dry tensile of the sample was tested in an Instron testing machine with a jaw distance of 5 inches (76.2 mm), where the jaws were padded or taped sample ends. The crosshead speed used for the Instron machine was 0.2 inches (5 mm) per minute. In the dry tensile test, the sample was placed in the Instron and the breaking point was measured in pounds per inch. Another sample that was 3 inches (76.2 mm) by 7 inches (178 mm) was soaked in water for a period of 5 minutes and then tested in the Instron testing machine under the same conditions as the dry tensile test to obtain wet tensile strength data. Another sample that was 3 inches by 7 inches was treated in a hot water bath at a temperature of 180° F. (92° C.) for a period of time of 10 minutes. This treated sample was then tested in the Instron testing machine using a similar procedure as that for the dry and wet tensile to obtain hot wet tensile data. The hot wet retention was calculated as a percentage and was determined in the following manner.

$$\% \text{ Hot wet retention} = \frac{\text{Hot wet tensile}}{\text{Dry tensile}} \times 100\%$$

The binder distribution in the nonwoven, sheet-like mat was tested according to loss on ignition (LOI). The sample weight was 3 to 5 grams weighed to the nearest 1/100 of a gram and the temperature of treatment was 600±25° C. for a period of time of 15±1 minute. The LOI is recorded to the nearest 1/10 percent for each sample.

The foregoing has described a composition for use with glass fibers to render chopped glass fibers more readily dispersible in aqueous media. The composition can be used by treating glass fibers to be dispersed in an aqueous media, or by adding the composition to the water in which the chopped glass fibers are to be dispersed either before or with the addition of the chopped glass fibers to the water. Also described are treated glass fiber strands, which are chopped and have good dispersibility in aqueous solutions with or without dispersing aids. Another feature of the present aforedescribed invention is the nonwoven, sheet-like mat of chopped glass fibers prepared from an aqueous dispersion of glass fibers, where the dispersion has good uniformity, which leads to good properties for the resulting mat during processing. The nonwoven, sheet-like mat, having the binder is useful as a substitute for felt in the production of shingles and also as a base or reinforcing material in roofing such as built-up roofing systems and also as a base or reinforcing material for flooring applications. The foregoing features of the invention result from the composition having a nonionic surfactant and a quaternary ammonium salt compound.

We claim:

1. Method of dispersing chopped glass fibers in aqueous media, comprising:
   (a) adding to the aqueous media in which the glass fibers are to be dispersed about 10 to about 500 parts per million (PPM) of the aqueous media of a blend of a nonionic surfactant and cationic quaternary ammonium salt surfactant where the ratio of the nonionic to cationic surfactant is about 1 to about 99 to about 99 to about 1, and
   (b) adding sized or unsized chopped glass fibers to the aqueous media in an amount of about 0.001 to about 3 weight percent of the aqueous media, and
   (c) agitating the mixture to produce a dispersion of glass fibers in water.

2. Method of claim 1, wherein the nonionic and cationic surfactants are used as a blend in a ratio of about 3:1 to about 1:3.

3. Method of claim 1, wherein the nonionic surfactant is selected from polyoxyalkylene surfactants, alkoxylated alkyl phenols, linear substituted alkyl phenols and branch-chain substituted alkyl phenols, alkoxylated aliphatic alcohols, carboxylic esters, fatty acids esters of mono or di glycerides of fatty acids, fatty acids and/or esters of sorbitan and the polyoxyalkylene derivatives of sorbitan fatty acid esters, glycol esters of fatty acids, anhydrosorbitol esters, and alkoxylated anhydrous sorbitol esters and alkoxylated natural fats, oils and waxes, polyalkylene oxide block copolymers and polysiloxane-polyoxyalkylene copolymers and mixtures thereof.

4. Method of claim 1, wherein the nonionic surfactant is a fatty ester and the cationic surfactant is a fatty metho-sulfate quaternary ammonium salt.

5. Method of claim 1, wherein the cationic quaternary ammonium salt lubricating surfactant is selected from the group consisting of quaternary ammonium salts having the formula

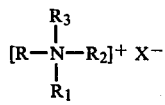

where one or more but not all of R, $R_1$, $R_2$, and $R_3$ can be selected from the compounds such as stearyl, tallow, cetyl, lauryl, myristyl, alkyl, alkyl with about 8 to about 18 carbon atoms, tetradecyl, dodecyl phenyl, alkyl phenyl, ixohexadecyl, and where $R_1$ and $R_2$ are lower alkyls having carbon atoms up to and including 6 or alkyl phenyls and X is an anionic group selected from chloro, fluoro, ido, bromo, hydroxyl, nitrate, sulfate, phosphate and toluene sulfonate.

6. Method of claim 1, wherein the blend is added to the aqueous media before the glass fibers are added.

7. Method of claim 1, wherein the blend and glass fibers are added simultaneously to the aqueous media.

8. Aqueous dispersion of chopped glass fiber strands produced by the method of claim 1, where the chopped glass fibers having a length of about 1/16 of an inch to about 3 inches.

9. Aqueous dispersion of claim 8, which also has dispersing agents present before the addition of the treated glass fibers.

10. Aqueous dispersion of claim 8, wherein the dispersing agent is polyoxy alkylated tallow amine.

11. Aqueous dispersion of claim 8, which also has hydroxy or alkoxy methyl cellulose thickening agents.

12. Aqueous dispersion of claim 8, which also has thickening agents added before the addition of the glass fiber.

13. Nonwoven, sheet-like mat made from the dispersion of claim 8.

14. Nonwoven mat of claim 13, which is impregnated with a polymeric binder selected from the group consisting of phenol formaldehyde, melamine formaldehyde, urea formaldehyde, anionic or cationic modified phenol, melamine or urea formaldehyde, and epichlorohydrin and amino resins that have been cured together.

* * * * *